United States Patent
Miyamoto (10) Patent No.: US 11,152,773 B2
(45) Date of Patent: Oct. 19, 2021

(54) OPENING CLOSURE DEVICE FOR CASE

(71) Applicant: Sumitomo Wiring Systems, Ltd., Mie (JP)

(72) Inventor: Takeru Miyamoto, Mie (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 16/721,984

(22) Filed: Dec. 20, 2019

(65) Prior Publication Data
US 2020/0203940 A1 Jun. 25, 2020

(30) Foreign Application Priority Data

Dec. 25, 2018 (JP) .............................. JP2018-241079

(51) Int. Cl.
*H02G 3/14* (2006.01)
*H02G 3/08* (2006.01)

(52) U.S. Cl.
CPC .............. *H02G 3/14* (2013.01); *H02G 3/081* (2013.01)

(58) Field of Classification Search
CPC ... H01R 9/16; H01R 9/18; H01R 9/20; H01R 12/7047; H01R 13/502; H01R 13/73; H01R 13/6581; H01R 13/6596; H02G 3/14; H02G 3/081
See application file for complete search history.

(56) References Cited

U.S. PATENT DOCUMENTS

| | | | |
|---|---|---|---|
| 8,545,265 B2 * | 10/2013 | Sakamoto | B29C 45/14467 439/606 |
| 2011/0235977 A1 * | 9/2011 | Yamada | G02B 6/383 385/76 |
| 2018/0316142 A1 | 11/2018 | Yokotani | |

FOREIGN PATENT DOCUMENTS

JP 2017-092418 5/2017

* cited by examiner

*Primary Examiner* — Roshn K Varghese
(74) *Attorney, Agent, or Firm* — Gerald E. Hespos; Michael J. Porco; Matthew T. Hespos (57) ABSTRACT

An opening closure device for a case includes a mounting member (30) and a cover (90). The mounting member (30) includes first and second mounting pieces (60A) to overlap part of a periphery of an opening in an outer surface of the case and each has a screw insertion hole (63A, 63B). The cover (90) includes a cover body (92) to cover at least a part of the mounting member (30), a first screwing/fixing piece (94A) to overlap the first mounting piece (60A) and formed with a screw insertion hole (93Ah) and a second screwing/fixing piece (94B) to overlap on the second mounting piece (60B) and formed with a screw insertion hole (93Bh). At least one of the first and second mounting pieces (60A) has a rotation stop (64A, 64B) to linearly contact the first or second screwing/fixing piece (94A, 94B) when viewed from outside of the opening.

16 Claims, 7 Drawing Sheets

OPENING CLOSURE DEVICE FOR CASE

BACKGROUND

Field of the Invention

This invention relates to an opening closure device for a case.

Related Art

Japanese Unexamined Patent Publication No. 2017-092418 discloses a device case that has a case wall, a shield connector mounted on the case wall, a work opening through the case wall, and a seal cover for closing the work opening. The case wall is provided with a positioning pin extending vertically to a mounting surface. The positioning pin contacts a mounting plate of the seal cover to restrict rotation of the seal cover with respect to the device case.

The seal cover is mounted by tightening a bolt, and thus a large force for rotating the seal cover may be generated. The positioning pin and the mounting plate contact each other in a limited region when restricting the rotation of the seal cover, and the positioning pin may deform the mounting plate.

Accordingly, the invention aims to stop rotation of a cover while suppressing deformation of the cover.

SUMMARY

A first aspect of the invention is directed to an opening closure device to be mounted on a case that includes an opening. The opening closure device includes a mounting member having first and second mounting pieces to be overlapped on first and second parts of a periphery of the opening in an outer surface of the case and formed with a first and second screw insertion holes. The mounting member closes the opening. The opening closure device further has a cover with a cover body configured to cover at least a part of the mounting member. First and second screwing/fixing pieces are to be overlapped respectively on the first and second mounting pieces and are formed respectively with screw insertion holes. At least one of the first and second mounting pieces is formed with a rotation stop configured to linearly contact the first or second screwing/fixing piece when viewed from the outside of the opening. Thus, the rotation of the cover can be stopped while deformation of the cover is suppressed.

The rotation stop may be configured to surround the first or second screwing/fixing piece at least except in a part where the first or second screwing/fixing piece is linked to the cover body. Accordingly, the cover can be positioned by disposing the first or second screwing/fixing piece in the rotation stop portion.

The first and second mounting pieces may be formed with the rotation stops. Accordingly, rotation of the cover can be stopped regardless of which of the first and second mounting pieces is screwed initially.

The mounting member may include a metal plate having a first mounting metal piece serving as a base of the first mounting piece and a second mounting metal piece serving as a base of the second mounting piece. The rotation stop may be formed by a molded resin portion molded with at least a part of the metal plate as an insert part. Accordingly, the rigidity of the mounting member can be enhanced by the metal plate. Further, the molded resin portion enables the rotation stop can be manufactured easily.

The cover may be a shield cover, and the rotation stop portion may contact the first mounting metal piece or the second mounting metal piece while being linearly in contact with the first screwing/fixing piece or the second screwing/fixing piece. Thus, the shield cover can be conductive with the metal plate via the first or second mounting metal piece. In this way, the shield cover is grounded easily via the metal plate.

The molded resin portion may include a part to be mounted on at least a part of a periphery of the first mounting metal piece or the second mounting metal piece. The rotation stop formed by the molded resin portion can be positioned firmly with respect to the first or second mounting metal piece.

The molded resin portion may include a reinforcing portion configured to cover at least one principal surface of a base end part of the first mounting metal piece or the second mounting metal piece.

An eighth aspect of the invention is directed to the opening closure device for case according to the seventh aspect, wherein the reinforcing portion includes a part formed into an elongated projection shape extending outward from the base end part of the first mounting metal piece or the second mounting metal piece. Thus, deformation of the base end part of the first or second mounting metal piece can be suppressed.

The mounting member may hold an end part of a wire-like body in a state where a terminal mounted on the end part of the wire-like body is connectable to a terminal on the case side. Accordingly, the first or second mounting metal piece can be reinforced while the used amount of resin is reduced.

According to the invention, rotation of the cover can be stopped while the deformation of the cover is suppressed in one type of a connector structure in which the terminal mounted on the end part of the wire-like body is connected to the terminal on the case side.

DETAILED DESCRIPTION

Figure 1:
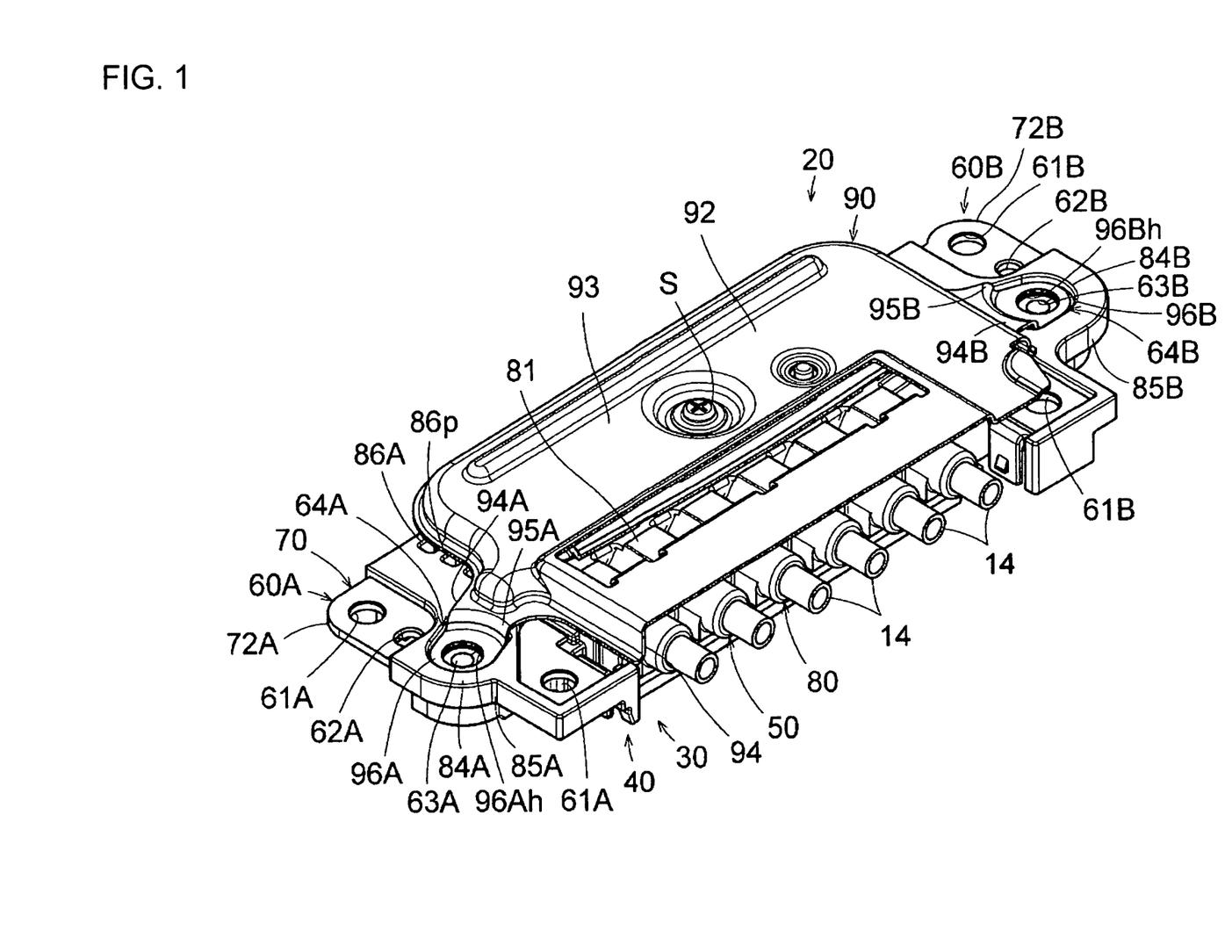
FIG. 1 is a perspective view showing a connector structure according to an embodiment.
Figure 2:
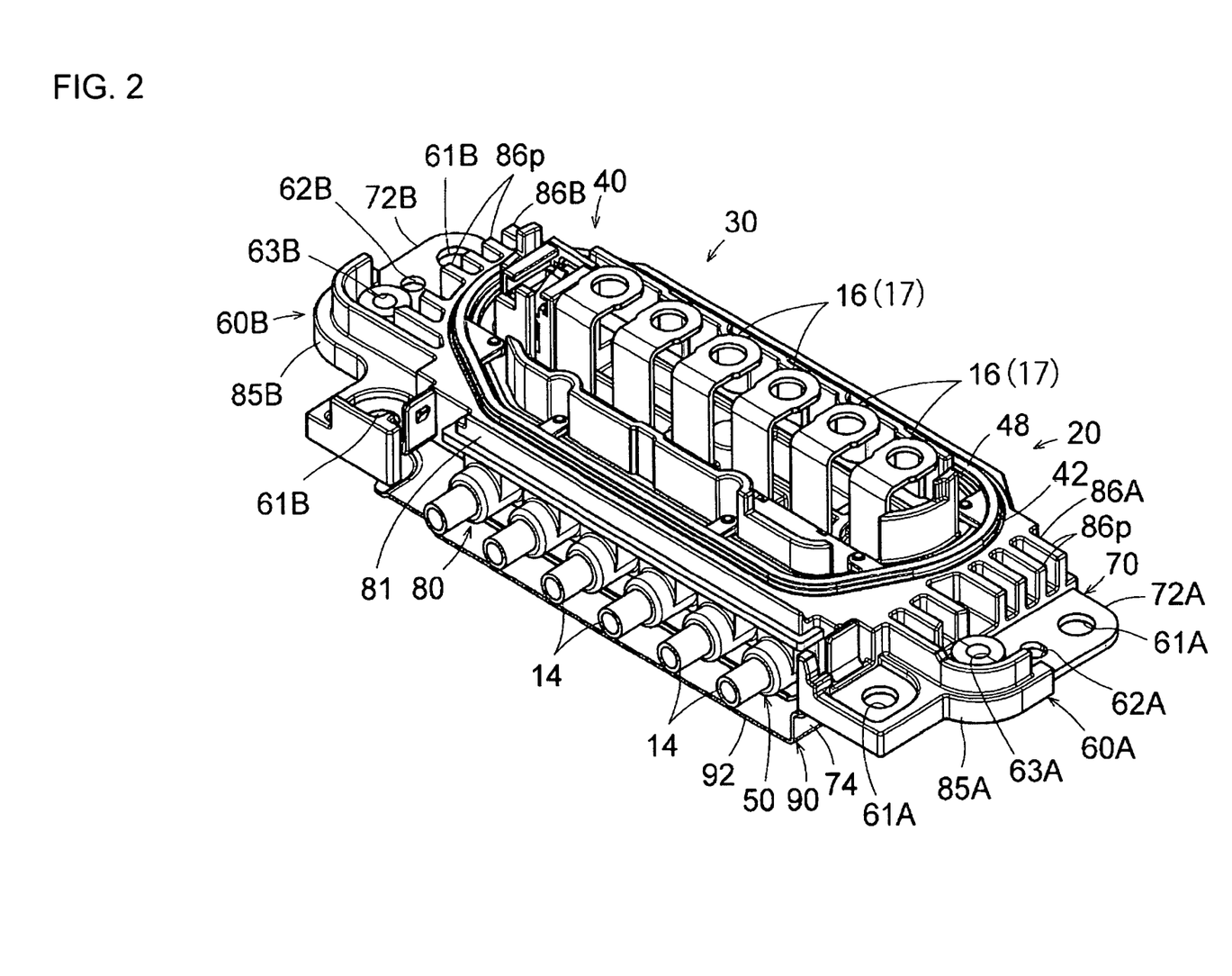
FIG. 2 is a perspective view showing the connector structure.
Figure 3:
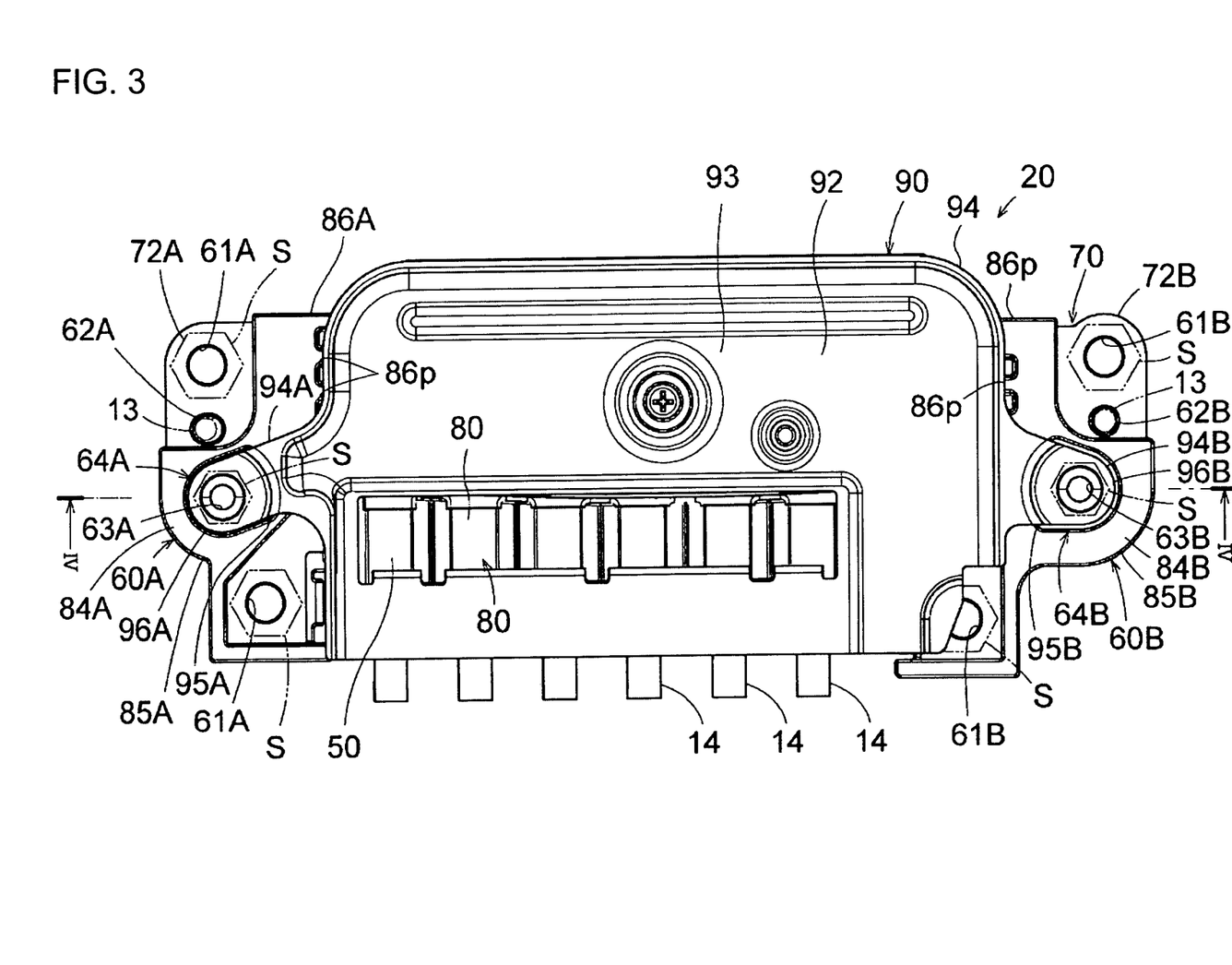
FIG. 3 is a plan view showing the connector structure.
Figure 4:
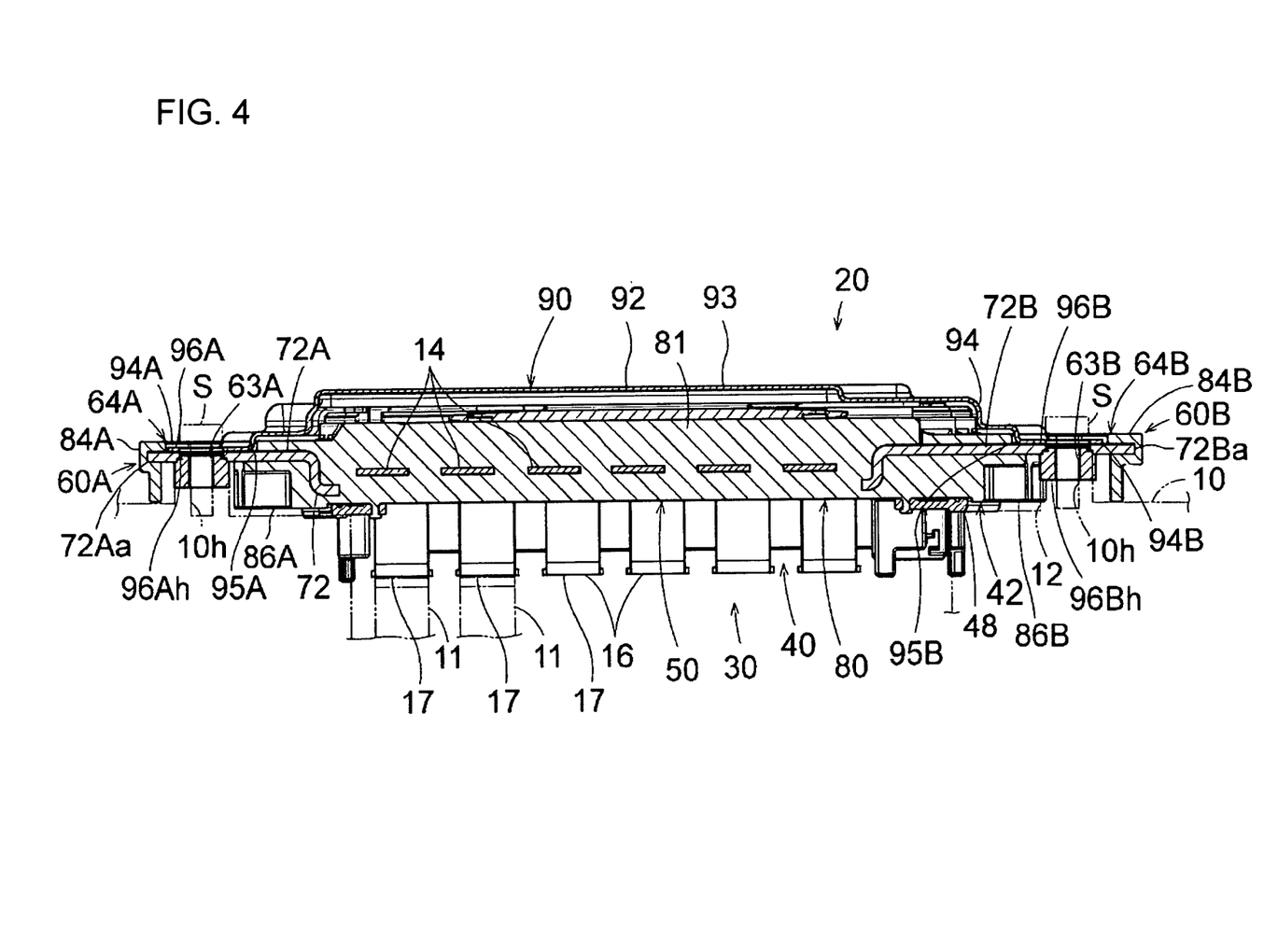
FIG. 4 is a section along IV-IV of FIG. 3.
Figure 5:
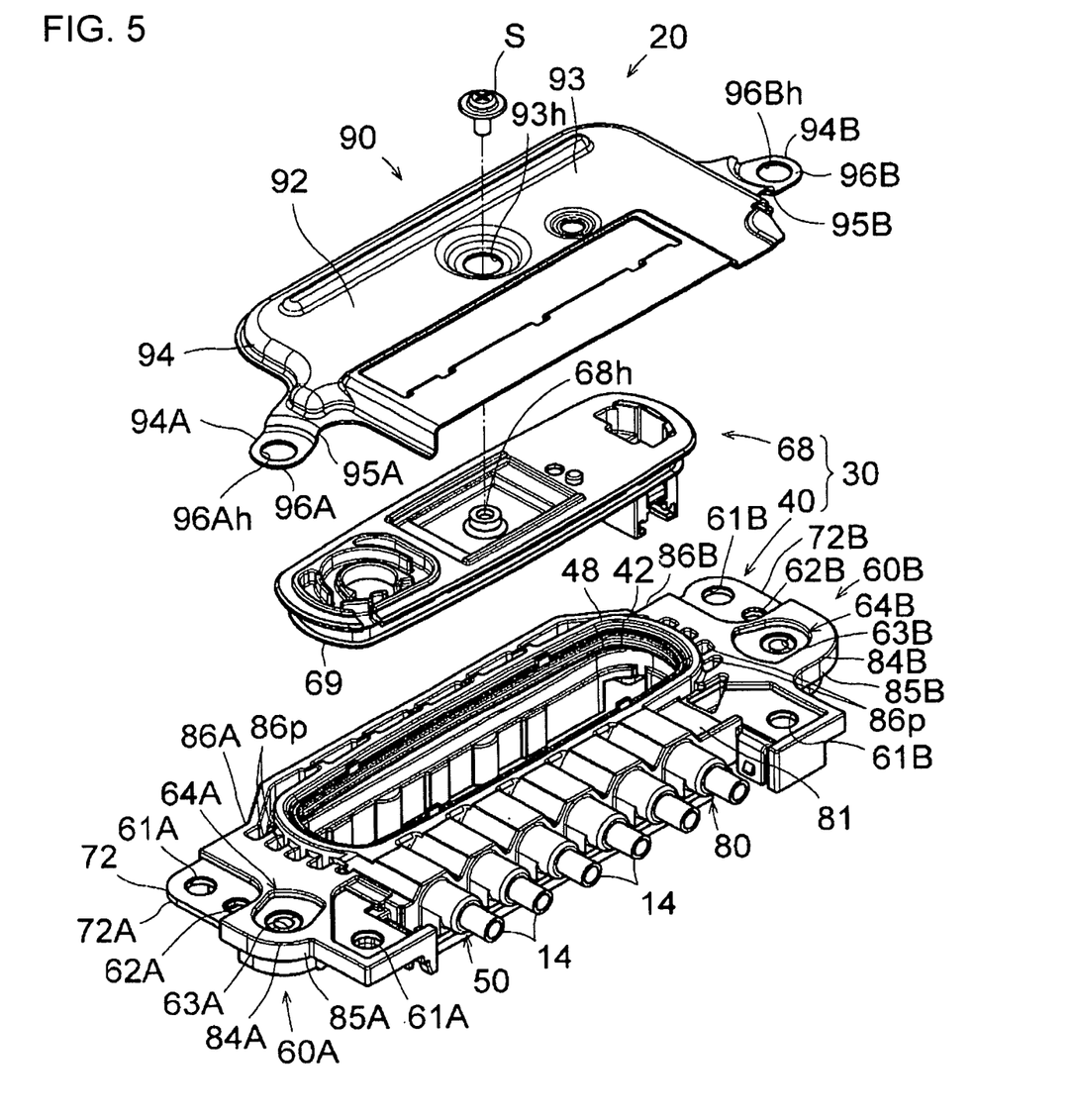
FIG. 5 is an exploded perspective view of the connector structure.

An opening closure device for case according to an embodiment is described. FIGS. 1 and 2 are perspective views showing a connector structure 20, FIG. 3 is a plan view showing the connector structure 20, FIG. 4 is a section along IV-IV of FIG. 3, and FIG. 5 is an exploded perspective view of the connector structure 20.

The connector structure 20 is mounted on a case 10 (see FIG. 4) including an opening 12, and includes a mounting member 30 and a cover 90. The mounting member 30 is mounted on a part of the case 10 formed with the opening 12 to close the opening 12. In this embodiment, the opening 12 is an elliptical hole, but the opening 12 may be a circular or rectangular hole. The cover 90 is configured to cover at least a part of the mounting member 30. Although the connector structure 20 is described below as being configured to cover an elliptical opening, the connector structure is formed into a shape suitable to close an opening according to the shape of the opening.

The mounting member 30 holds end parts of wire-like bodies (hereinafter wires 14) in a state where terminals 16 mounted on the end parts of the wires 14 are connectable to terminals 11 on the side of the case 10. Specifically, the terminals 11 are provided inside the opening 12 in the case 10 (only partially shown in FIG. 4). In a specific example, the wire 14 is a power supply line in a vehicle. The terminal 16 is mounted on the end part of the wire 14 by crimping, welding or the like. The end parts of the wires 14 are held in the mounting member 30 and the terminals 16 on the end parts of the wires 14 also are held in a given posture in the mounting member 30. When the mounting member 30 is mounted on the part of the case 10 formed with the opening 12, the terminals 16 are disposed to face the terminals 11 in the case 10. By connecting the terminals 11 and 16 by screwing or the like, the wires 14 are connected electrically to the terminals 11 via the terminals 16. In this way, the wires 14 are connected electrically to an electrical component in the case 10. The terminals on the end parts of the wires may be fit to the terminals in the case by a male-female mating structure.

Further, the cover 90 is a shield cover formed of metal or the like and configured to electromagnetically shield the opening 12. The end parts of the wires 14 and connected parts of the terminals 16 and 11 are shielded electromagnetically.

Although the opening closure device is applied to the connector structure in this embodiment, the opening closure device is not limited to that to the connector structure. For example, this opening closure device is applicable also when a mounting member is mounted to close an opening without holding end parts of wires and terminals.

The mounting member 30 includes a mounting body 40 and a lid 68.

The mounting body 40 includes a peripheral wall 42, a holding portion 50, a first mounting piece 60A and a second mounting piece 60B.

The peripheral wall 42 has a tubular shape corresponding to a peripheral edge of the opening 12, here, a short elliptical tube. With the mounting member 30 mounted on the opening 12, the peripheral wall 42 is disposed along the peripheral edge of the opening 12. An annular sealing member 48 formed of rubber or the like is mounted on an opening on one end (lower end) of the peripheral wall 42. With the mounting member 30 mounted on the part of the case 10 formed with the opening 12, the annular sealing member 48 on the one end of the peripheral wall 42 is compressed between the peripheral wall 42 and the opening 12 of the case 10 to seal between the peripheral wall 42 and the opening 12. In this state, the upper end part of the peripheral wall 42 projects upwardly of the case 10.

With the mounting body 40 mounted on the case 10, an opening is formed in the peripheral wall 42. A screw fastening can be carried out to connect tip parts 17 of the terminals 16 to be described later and the terminals 11.

The holding portion 50 is a part for holding one end part of each wire-like body 14 and a base end part of each terminal 16 in a given posture. The holding portion 50 projects out from one long side of the peripheral wall 42. The end parts of wires 14 (six here) are held in a parallel posture extending from an outer side of the holding portion 50 toward the peripheral wall 42. Further, the base end parts of the terminals 16 on the end parts of the wires 14 are held in parallel by the holding portion 50. The terminals 16 extend toward the inside of the peripheral wall 42 from the end parts of the wires 14 and are bent toward the one end side of the peripheral wall 42 (inwardly of the case 10) in the peripheral wall 42. Further, tips of bent parts are bent to be perpendicular to an axial direction of the peripheral wall 42 at positions outside the opening on the one end of the peripheral wall 42. With the mounting member 30 mounted on the part of the case 10 formed with the opening 12, the tips 17 of the terminals 16 are held to come into surface contact with the terminals 11 inside the case 10. In this way, the tips 17 of the terminals 16 and the terminals 11 are overlapped and electrically and mechanically connected by screwing or the like.

The first mounting piece 60A extends out from one longitudinal end of the peripheral wall 42, and the second mounting piece 60B extends out from the other longitudinal end part of the peripheral wall 42. With the mounting member 30 mounted on the part of the case 10 formed with the opening 12, the first mounting piece 60A is partially overlapped on a part around the opening 12, namely, a part outward of one longitudinal end of the opening 12, on the outer surface of the case 10. Further, the second mounting piece 60B partially overlaps on another part around the opening 12, namely a part outward of the other longitudinal end side of the opening 12, on the outer surface of the case 10.

The first mounting piece 60A is formed with first mounting piece fixing holes 61A, and the second mounting piece 60B is formed with second mounting piece fixing holes 61B. In each of the first and second mounting pieces 60A, 60B, two mounting piece fixing holes 61A or 61B are formed at positions on both transverse ends of the peripheral wall 42. With the first and second mounting pieces 60A, 60B overlapped on the outer surface of the case 10, screws S are inserted into the mounting piece fixing holes 61A and 61B (see FIG. 3). These screws S are fastened threadedly to screw holes formed in the case 10 to fix the mounting body 40 to the case 10.

Note that the number of screwing positions can vary. Each of the first mounting piece 60A and the second mounting piece 60B may be screwed and fixed at least at one position. Further, screw shafts may project from the case 10 and project out through the mounting piece fixing holes 61A, 61B and nuts may be fastened to the screw shafts.

The first mounting piece 60A is formed with a positioning hole 62A, and the second mounting piece 60B is formed with a positioning hole 62B. In each of the first and second mounting pieces 60A, 60B, the positioning hole 62A or 62B is formed at a middle position in a transverse direction of the peripheral wall 42. Positioning pins 13 project out from the case 10 and are inserted into the positioning holes 62A or 62B with the first and second mounting pieces 60A, 60B overlapped on the outer surface of the case 10. The mounting body 40 is positioned with respect to the case 10 by inserting the positioning pins 13 into the positioning hole 62A or 62B.

Further, the first mounting piece 60B is formed with a first screw insertion hole 63A, and the second mounting piece 60B is formed with a second screw insertion hole 63B. In each of the first and second mounting pieces 60A, 60B, the screw insertion hole 63A or 63B is formed at a middle position in the transverse direction of the peripheral wall 42 while avoiding the positioning hole 62A or 62B. The screw insertion holes 63A, 63B receive the screws S when the cover 90 is screwed and fixed.

The lid 68 is formed of resin and is configured to close the inside of the peripheral wall 42 (see FIG. 5). More specifically, the lid 68 is in a plate having an outer peripheral surface shaped to correspond to the shape of the inner peripheral surface of the peripheral wall 42, i.e. having an elliptical outer peripheral surface. A resilient sealing member 69 formed of rubber or the like is provided on the outer periphery of the lid 68. With the lid 68 mounted in the peripheral wall 42, the opening in the peripheral wall 42 is closed. Thus, the mounting member 30 closes the opening 12 of the case 10. A screw hole 68h is formed in an outward facing part of the lid 68. The screw hole 68h is a non-penetrating hole open on an outer side. The cover 90 is screwed to the lid 68 by utilizing this screw hole 68h.

The cover 90 covers at least a part of the mounting member 30 and includes a cover body 92, a first screwing/fixing piece 94A and a second screwing/fixing piece 94B. Here, the cover 90 is formed of metal to function as an electromagnetic shield and is formed integrally, such as by press-working a metal plate. If the cover 90 is provided, such as for the purpose of protection from outside, the cover 90 may be made of resin or the like.

The cover body 92 covers at least a part of the mounting member 30. The cover body 92 includes a cover main plate 93 and a cover peripheral wall 94. The cover main plate 93 has a rectangular shape long that is a longitudinal direction of the peripheral wall 42 to spread over the entire peripheral wall 42 in a plan view. The cover peripheral wall 94 extends toward one principal surface side of the cover main plate 93 from three sides except a side where the wires 14 extend. In this way, the cover body 92 covers the peripheral wall 42 from above.

The first screwing/fixing piece 94A extends out from a first longitudinal end of the cover body 92, and the second screwing/fixing piece 94 extend out from a second longitudinal end of the cover body 92.

A width of the first screwing/fixing piece 94A is smaller than a dimension of the first mounting piece 60A in the transverse direction of the peripheral wall portion 42. A tip part 96A of the first screwing/fixing piece 94A is recessed toward the case 10 via an arcuate step 95A convex inward. An outer peripheral edge part of the tip 96A of the screwing/fixing piece 94A is formed into a partial circumferential shape. Further, the tip 96A of the first screwing/fixing piece 94A is formed with a screw insertion hole 96Ah. With the cover 90 mounted on the mounting member 30, the tip part 96A of the first screwing/fixing piece 94A is overlapped on a partial region of the first mounting piece 60A. In this state, the screw insertion hole 96Ah is disposed at a position coinciding with the screw insertion hole 63A of the first mounting piece 60A.

A width of the second screwing/fixing piece 94B is smaller than a dimension of the second mounting piece 60B in the transverse direction of the peripheral wall 42. A tip 96B of the second screwing/fixing piece 94B is recessed toward the case 10 via an arcuate step 95B convex inward. An outer peripheral part of the tip 96B of the screwing/fixing piece 94B is formed into a partial circumferential shape. Further, the tip 96B of the second screwing/fixing piece 94B is formed with a screw insertion hole 96Bh. With the cover 90 mounted on the mounting member 30, the tip 96B of the second screwing/fixing piece 94B is overlapped on a partial region of the second mounting piece 60B. In this state, the screw insertion hole 96Bh is disposed at a position coinciding with the screw insertion hole 63B of the second mounting piece 60B.

With the cover 90 overlapped on the mounting member 30, the tip 96A of the first screwing/fixing piece 94A is overlapped on the first mounting piece 60A and the tip part 96B of the second screwing/fixing piece 94B is overlapped on the second mounting piece 60B. Then, the screw S is fastened threadedly to a screw hole 10h provided in the case 10 through the screw insertion holes 96Ah and 63A. Further, the screw S is fastened threadedly to a screw hole 10h provided in the case 10 through the screw insertion holes 96Bh and 63B. In this way, the cover 90 is mounted on the mounting member 30.

Note that a screw insertion hole 93h is formed in a central part of the cover main plate portion 93, and a screw S is threadedly fastened to the screw hole 68h of the lid 68 through the screw insertion hole 93h.

If the screw S is tightened in mounting the cover 90, a force for rotating the cover 90 about this screw S acts. To suppress the rotation of the cover 90, it is considered to bring the positioning pins 13 projecting on the case 10 into contact with the cover 90. However, the positioning pins 13 and the cover 90 are in contact in a small contact area since the positioning pins 13 have an elongated shape. Thus, the cover 90 may be deformed in contact parts. Particularly, in the case of using the cover 90 as an electromagnetic shield or the like, the cover 90 may be deformed if the rotation is stopped by the positioning pins 13 since the cover 90 is thought to be thinner than the first and second mounting pieces 60A, 60B of the mounting member 30.

To stop the rotation of the cover 90 while suppressing the deformation of the cover 90, at least one of the first and second mounting pieces 60A, 60B is formed with a rotation stop 64A or 64B that linearly contacts the first or second screwing/fixing piece 94A or 94B.

Here, it is assumed that either one of the first and second screwing/fixing pieces 94A, 94B is first screwed and the other is screwed later in screwing and fixing the cover 90. In first screwing one of the first and second screwing/fixing pieces 94A, 94B, the cover 90 possibly rotates in rotating the screw S. In screwing the other of the first and second screwing/fixing pieces 94A, 94B later, the cover 90 is hard to rotate since one of the first and second screwing/fixing pieces 94A, 94B is already positioned by the tightened screw S. Thus, only one of the rotation stops 64A, 64B may be formed. In the case of providing both the first and second screwing/fixing pieces 94A, 94B with the rotation stop, there is an advantage that the rotation of the cover 90 can be stopped even if either one of the first and second screwing/fixing pieces 94A, 94B is first screwed.

Further, the rotation stop 64A, 64B is shaped to surround the first or second screwing/fixing piece 94A, 94B at least except in a part where the first or second screwing/fixing piece 94A, 94B is linked to the cover body 92.

More specifically, the rotation stop 64A is formed into a concave shape corresponding to the shape of the tip 96A of the first screwing/fixing piece 94A. More specifically, an outer part of an inner peripheral surface constituting the rotation stop 64A is formed into a partial circumferential shape corresponding to the partial circumferential shape of the tip part 96A of the first screwing/fixing piece 94A. Thus, the tip 96A of the first screwing/fixing piece 94A is fit into the rotation stop 64A and positioned by the inner peripheral surface of the rotation stop 64A. Here, an inner part of the inner peripheral surface constituting the rotation stop 64A is formed into an arcuate shape corresponding to the shape of the arcuate step 95A. Thus, the arcuate step 95A on a base end part of the tip 96A also is positioned by the inner peripheral surface of the rotation stop 64A.

Similarly, the rotation stop 64B is formed into a concave shape corresponding to the shape of the tip 96B of the second screwing/fixing piece 94B. More specifically, an outer part of an inner peripheral surface constituting the rotation stop 64B is formed into a partial circumferential shape corresponding to the partial circumferential shape of the tip part 96B of the second screwing/fixing piece 94B. The tip 96B of the second screwing/fixing piece 94B is fit into the rotation stop 64B and positioned by the inner peripheral surface of the rotation stop 64B. Here, an inner part of the inner peripheral surface constituting the rotation stop 64B is formed into an arcuate shape corresponding to the shape of the arcuate step 95B. Thus, the arcuate step portion 95B on a base end of the tip 96B also is positioned by the inner peripheral surface of the rotation stop 64B.

Figure 6:
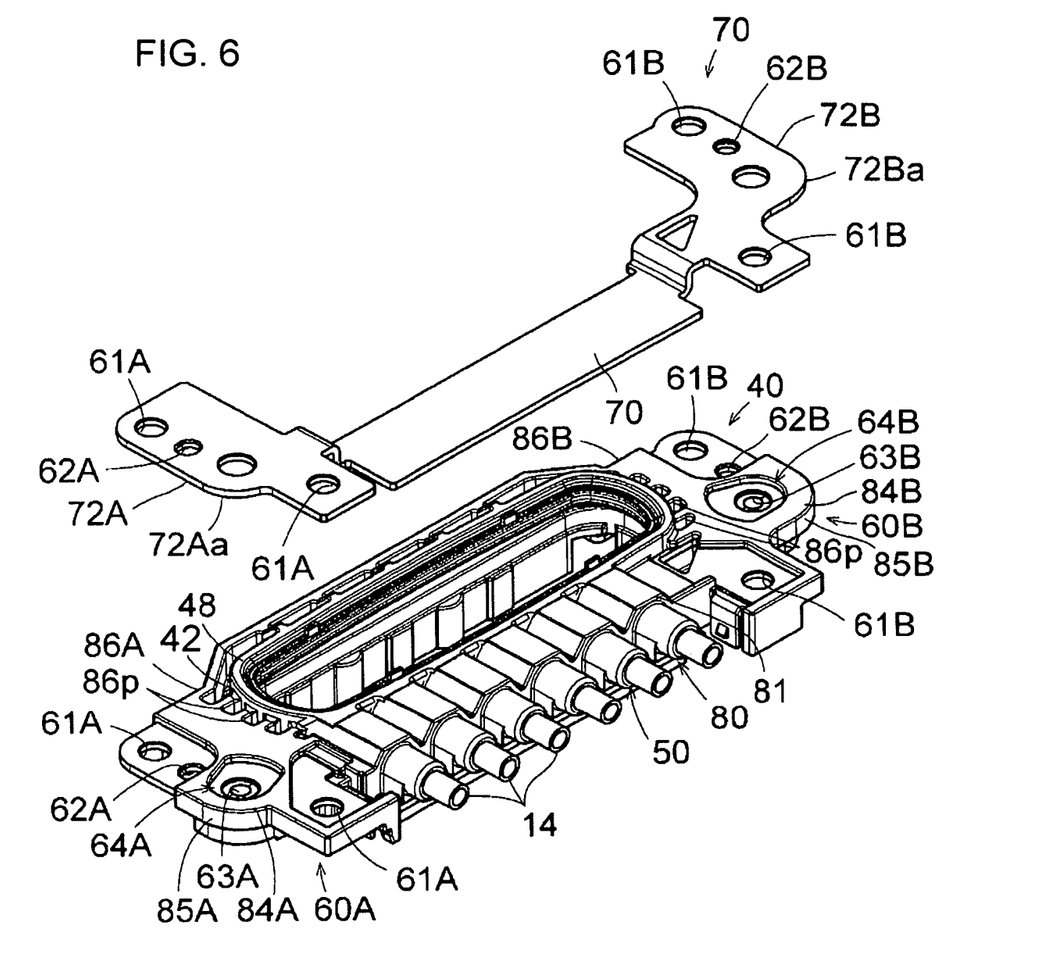
FIG. 6 is a perspective view showing a mounting member.
Figure 7:
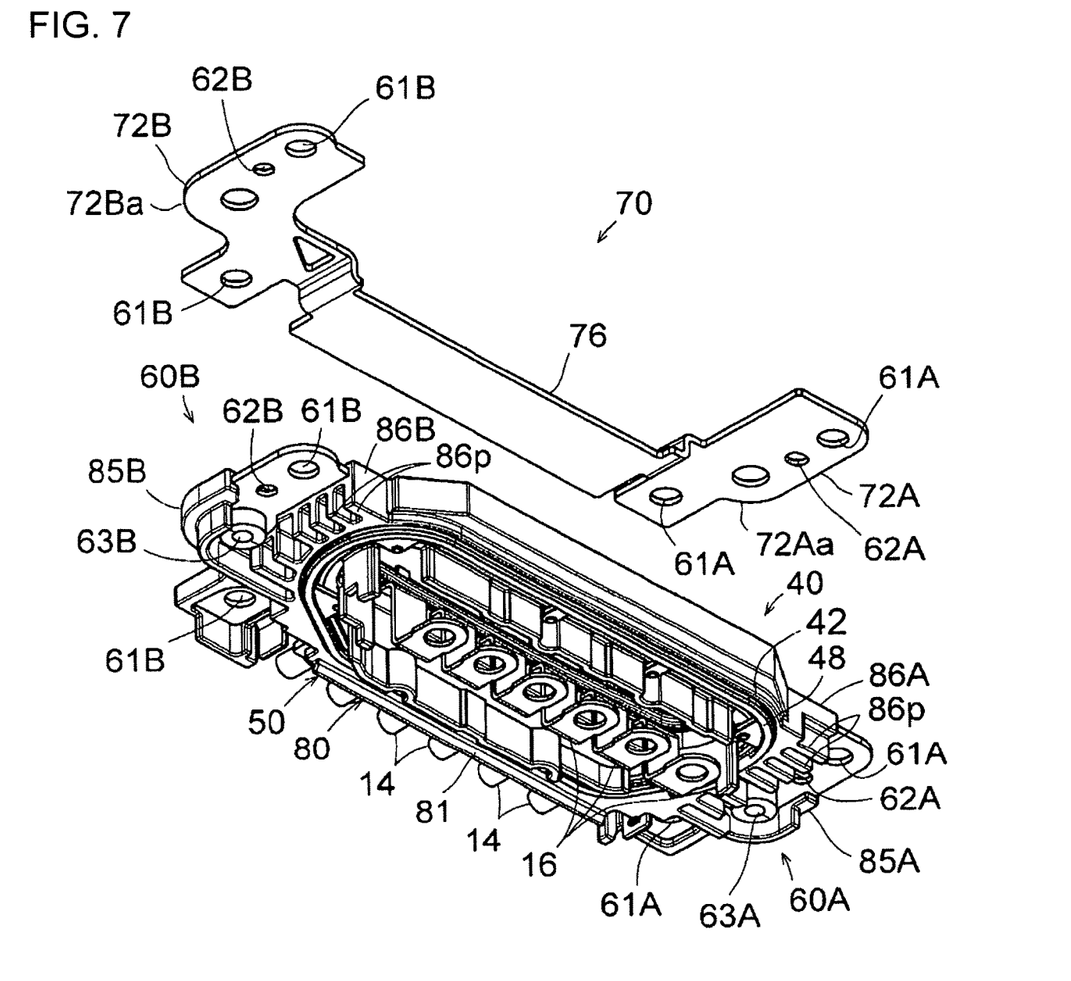
FIG. 7 is a perspective view showing the mounting member.

The mounting member 30 has a metal plate 70 and a molded resin portion 80. A configuration example of the rotation stops 64A, 64B is described in relation to the metal plate 70 and the molded resin portion 80. FIGS. 6 and 7 are perspective views showing the mounting member 30. For the sake of description, the configuration of only the mounting member 70 is drawn in a location different from the mounting member 30 in FIGS. 6 and 7.

As shown in FIGS. 1 to 7, the metal plate 70 is formed, such as by press-working a metal plate material. The metal plate 70 includes a first mounting metal piece 72A serving as a base of the first mounting piece 60A and a second metal mounting piece 72B serving as a base of the second mounting piece 60B. The mounting piece fixing holes 61A, positioning hole 62A and screw insertion hole 63A are formed in the first metal mounting piece 72A. Further, the mounting piece fixing holes 61B, positioning hole 62B and screw insertion hole 63B are formed in the second metal mounting piece 72B. Bosses in the form of short cylindrical tubes are provided on the screw insertion holes 63A, 63B, but are not essential. The first and second metal mounting pieces 72A, 72B are linked integrally via a coupling plate 76. The first and second metal mounting pieces 72A, 72B are linked to the coupling plate 76 via steps, and are at positions closer to the case 10 than the coupling plate 76.

The molded resin portion 80 is a resin part molded with at least a part of the metal plate 70 as an insert part. Here, the molded resin portion 80 is formed by molding with the coupling plate 76, a part of the first metal mounting piece 72A and a part of the second metal mounting piece 72B of the metal plate 70 as insert parts.

A molded body part 81 formed around the coupling plate 76, forms the peripheral wall 42 and the holding portion 50. Further, the molded resin portion 80 includes rotation stop forming portions 84A, 84B forming the rotation stops 64A, 64B.

The molded resin portion 80 partially covers both surfaces of the first and second metal mounting pieces 72A, 72B.

Parts of the molded resin portion 80 surrounding the screw insertion holes 63A, 63B in outward facing principal surfaces (outer surfaces in a state mounted on the case 10) of the first and second metal mounting pieces 72A, 72B are the rotation stop forming portions 84A, 84B. The inner peripheral surfaces of the recess-like rotation stop portions 64A, 64B are formed by the inner peripheral surfaces of the rotation stop forming portions 84A, 84B. The first or second metal mounting piece 72A, 72B is exposed on the bottom of the rotation stop forming portion 84A, 84B. Thus, with the first or second screwing/fixing piece 94A, 94B linearly held in contact with the rotation stop 64A, 64B in a plan view as described above, one principal surface of the tip part 96A, 96B of the first or second screwing/fixing piece 94A, 94B is in surface contact with the first or second metal mounting piece 72A, 72B.

If the first or second metal mounting piece 72A, 72B is screwed to the case 10 with a screw S formed of metal, the metal plate 70 is conductive with the case 10. Thus, the cover 90 serving as a shield cover easily is grounded to the case 10 via the metal plate 70.

Further, the molded resin portion 80 includes parts 85A, 85B mounted on at least parts of peripheries of the first and second metal mounting pieces 72A, 72B. The part 85A, 85B extends along a peripheral edge part of the first or second metal mounting piece 72A, 72B from the rotation stop forming portion 84A, 84B and is mounted on this peripheral edge part. More specifically, the first or second metal mounting piece 72A, 72B includes an arcuate edge 72Aa, 72Ba extending along ¼ of a circumference on an outer peripheral part of the screw insertion hole 63A, 63B (see FIGS. 6 and 7), and the part 85A, 85B is mounted on this edge 72Aa, 72Ba. Thus, the rotation stop forming portion 84A, 84B is more reliably positioned with respect to the first or second metal mounting piece 72A, 72B, and can effectively receive a rotation stopping force.

The molded resin portion 80 includes reinforcing portions 86A, 86B for covering at least one principal surface of a base end of the first or second metal mounting piece 72A, 72B. Each reinforcing portion 86A, 86B extends outward from the molded body part 81 with respect to a base end part of the one principle surface (surface opposite to the case 10) of the first or second metal mounting piece 72A, 72B, and the rotation stop forming portion 84A, 84B is linked to the reinforcing portion 86A, 86B. Further, a reinforcing portion 86A, 86B also extends out from the molded body 81 with respect to a base end part of the other principal surface (surface on the side of the case 10) of the first or second metal mounting piece 72A, 72B.

The base ends of the first and second metal mounting pieces 72A, 72B are hard to deform due to the reinforcing portions 86A, 86B. Thus, forces for screwing the first and second metal mounting pieces 72A, 72B can be transmitted effectively to the coupling plate portion 76 and the mounting body portion 40.

Further, the reinforcing portion 86A, 86B includes projections 86p in the form of elongated ribs extending outward from the base ends of the first and second metal mounting pieces 72A, 72B. In other words, the reinforcing portions 86A, 86B are formed with recesses elongated out from the base end parts of the first and second metal mounting pieces 72A, 72B. Since the reinforcing portions 86A, 86B are shaped to include the elongated projections 86p, the base end parts of the first and second metal mounting pieces 72A, 72B can be reinforced while reducing the amount of resin that is used.

At least one of the first and second mounting pieces 60A, 60B is formed with the rotation stop 64A, 64B configured to linearly contact the first or second screwing/fixing piece 94A, 94B when viewed from the outside of the opening 12. Thus, in inserting the screw S into the screw insertion hole 96Ah, 96Bh and the screw insertion hole 63A, 63B and fastening the screw S, the rotation of the cover 90 is suppressed by the above linear contact even if a screw head of the screw S contacts the first or second screwing/fixing piece 94A, 94B and tries to rotate the cover 90. Since the first or second screwing/fixing piece 94A, 94B is linearly in contact with the rotation stop portion 64A, 64B, a rotational torque is received in a relatively large region and the cover 90 is hard to deform. In this way, the rotation of the cover 90 can be stopped while the deformation of the cover 90 is suppressed.

Further, both the first and second mounting pieces 60A, 60B are formed with the rotation stops 64A, 64B. Regardless of which of the first and second screwing/fixing pieces 94A, 94B is first screwed, the rotation of the cover 90 can be stopped and work efficiency is excellent.

Further, each rotation stop 64A, 64B is formed into a shape surrounding the first or second screwing/fixing piece 94A, 94B. Thus, the cover 90 can be positioned by disposing the tip part 96A, 96B of the first or second screwing/fixing piece 94A, 94B in the rotation stop portion 64A, 64B. In this way, an operation of inserting the screw S into the screw insertion hole 96Ah, 96Bh and the screw insertion hole 63A, 63B and like operations can be easily performed, whereby a screw fastening operation can be easily performed.

Further, since the mounting body 40 is composed of the metal plate 70 and the molded resin portion 80, the rigidity of the mounting body 40 can be enhanced by the metal plate 70. Further, the rotation stops 64A, 64B can be easily manufactured by the molded resin portion 80.

Further, since the metal plate 70 is exposed in the rotation stops 64A, 64B, the first or second screwing/fixing piece 94A, 94B contacts the metal plate 70 to become conductive with the metal plate 70 if the first or second screwing/fixing piece 94A, 94B is disposed in the rotation stop 64A, 64B. Thus, the cover 90 is easily grounded via the metal plate 70.

Further, since the molded resin portion 80 is mounted on at least a part of the periphery of the first or second mounting metal piece 72A, 72B, the rotation stop portions 64A, 64B can be firmly positioned with respect to the first and second mounting metal pieces 72A, 72B. Thus, the rotation of the cover 90 with respect to the mounting body portion 40 can be more reliably stopped.

Further, the molded resin portion 80 includes the reinforcing portion 86A, 86B mounted on at least one principal surface of the first or second mounting metal piece 72A, 72B. Thus, the deformation of the base end part of the first or second mounting metal piece 72A, 72B can be suppressed and the mounting body portion 40 can be firmly fixed to the case 10 by screwing and fixing the first or second mounting metal piece 72A, 72B to the case 10.

Further, since the reinforcing portion 86A, 86B includes the projection-shaped parts 86p in the form of elongated projections extending outward from the base end part of the first or second mounting metal piece 72A, 72B, the first or second mounting metal piece 72A, 72B can be reinforced while the used amount of resin is reduced.

Further, by applying the opening closure device for case to the connector structure 20, the rotation of the cover 90 can be stopped while the deformation of the cover 90 is suppressed in the connector structure in which the terminals 16 mounted on the end parts of the wire-like bodies 14 are connected to the terminals 11 on the side of the case 10.

In this embodiment, the mounting member 30 may be configured as one member. Further, the mounting body portion 40 may be formed only of metal or only of resin.

The respective components described in the above embodiment and modifications can be combined as appropriate unless the combined components contradict with each other.

Although this invention has been described in detail above, the above description is illustrative in all aspects and this invention is not limited thereto. Numerous modifications and alterations not illustrated are understood to be well within the scope of this invention.

LIST OF REFERENCE SIGNS 10 case
10h screw hole
12 opening
14 wire
16 terminal
20 connector structure
30 mounting member
40 mounting body
60A first mounting piece
60B second mounting piece
61A, 61B mounting piece fixing hole
63A, 63B screw insertion hole
64A, 64B rotation stop
70 metal plate
72A first mounting metal piece
72Aa edge
72B second mounting metal piece
72Ba edge
80 molded resin portion
84A, 84B rotation stop forming portion
85A, 85B part to be mounted on edge
86A, 86B reinforcing portion
86p projection
90 cover
92 cover body
94A first screwing/fixing piece
94B second screwing/fixing piece
96A, 96B tip
96Ah, 96Bh screw insertion hole

What is claimed is:

1. An opening closure device to be mounted on a case that has an opening, comprising:

a mounting member including a metal plate having a first mounting metal piece and a second metal mounting piece, a first mounting piece provided on the first metal mounting piece and to be overlapped on a part of a periphery of the opening in an outer surface of the case and formed with a first screw insertion hole and a second mounting piece provided on the second metal mounting piece and to be overlapped on another part of the periphery of the opening in the outer surface of the case and formed with a second screw insertion hole, the mounting member closing the opening;

a shield cover including a cover body configured to cover at least a part of the mounting member, a first screwing/fixing piece to be overlapped on the first mounting piece and formed with a screw insertion hole and a second screwing/fixing piece to be overlapped on the second mounting piece and formed with a screw insertion hole; and at least one of the first mounting piece and the second mounting piece being formed with a rotation stop formed by a molded resin portion molded with at least a part of the metal plate as an insert part and configured to linearly contact the first screwing/fixing piece or the second screwing/fixing piece when viewed from outside of the opening, wherein the rotation stop is in contact with the first mounting metal piece or the second mounting metal piece while being linearly in contact with the first screwing/fixing piece or the second screwing/fixing piece.

2. The opening closure device of claim 1, wherein:

the rotation stop is configured to surround the first screwing/fixing piece or the second screwing/fixing piece at least except in a part where the first screwing/fixing piece or the second screwing/fixing piece is linked to the cover body.

3. The opening closure device of claim 1, wherein:
both the first mounting piece and the second mounting piece are formed with the rotation stop.

4. The opening closure device of claim 1, wherein:
the molded resin portion includes a part to be mounted on at least a part of a periphery of the first mounting metal piece or the second mounting metal piece.

5. The opening closure device of claim 1, wherein: the molded resin portion includes a reinforcing portion configured to cover at least one principal surface of a base end part of the first mounting metal piece or the second mounting metal piece.

6. The opening closure device of claim 5, wherein:
the reinforcing portion includes a part formed into an elongated projection shape extending out from the base end part of the first mounting metal piece or the second mounting metal piece.

7. The opening closure device of claim 1, wherein:
the mounting member holds an end of a wire in a state where a terminal mounted on the end part of the wire is connectable to a terminal on the case.

8. An opening closure device to be mounted on a case that has an opening, comprising:
a mounting member including a metal plate having a first mounting metal piece and a second metal mounting piece, a first mounting piece provided on the first metal mounting piece and to be overlapped on a part of a periphery of the opening in an outer surface of the case and formed with a first screw insertion hole and a second mounting piece provided on the second metal mounting piece and to be overlapped on another part of the periphery of the opening in the outer surface of the case and formed with a second screw insertion hole, the mounting member closing the opening;
a shield cover including a cover body configured to cover at least a part of the mounting member, a first screwing/fixing piece to be overlapped on the first mounting piece and formed with a screw insertion hole and a second screwing/fixing piece to be overlapped on the second mounting piece and formed with a screw insertion hole; and
at least one of the first mounting piece and the second mounting piece being formed with a rotation stop formed by a molded resin portion molded with at least a part of the metal plate as an insert part and configured to linearly contact the first screwing/fixing piece or the second screwing/fixing piece when viewed from outside of the opening,
wherein the molded resin portion includes a part to be mounted on at least a part of a periphery of the first mounting metal piece or the second mounting metal piece.

9. The opening closure device of claim 8, wherein:
the rotation stop is configured to surround the first screwing/fixing piece or the second screwing/fixing piece at least except in a part where the first screwing/fixing piece or the second screwing/fixing piece is linked to the cover body.

10. The opening closure device of claim 8, wherein:
both the first mounting piece and the second mounting piece are formed with the rotation stop.

11. The opening closure device of claim 8, wherein:
the molded resin portion includes a reinforcing portion configured to cover at least one principal surface of a base end part of the first mounting metal piece or the second mounting metal piece.

12. The opening closure device of claim 8, wherein:
the reinforcing portion includes a part formed into an elongated projection shape extending out from the base end part of the first mounting metal piece or the second mounting metal piece.

13. The opening closure device of claim 8, wherein:
the mounting member holds an end of a wire in a state where a terminal mounted on the end part of the wire is connectable to a terminal on the case.

14. An opening closure device to be mounted on a case that has an opening, comprising:
a mounting member including a metal plate having a first mounting metal piece and a second metal mounting piece, a first mounting piece provided on the first metal mounting piece and to be overlapped on a part of a periphery of the opening in an outer surface of the case and formed with a first screw insertion hole and a second mounting piece provided on the second metal mounting piece and to be overlapped on another part of the periphery of the opening in the outer surface of the case and formed with a second screw insertion hole, the mounting member closing the opening;
a shield cover including a cover body configured to cover at least a part of the mounting member, a first screwing/fixing piece to be overlapped on the first mounting piece and formed with a screw insertion hole and a second screwing/fixing piece to be overlapped on the second mounting piece and formed with a screw insertion hole; and
at least one of the first mounting piece and the second mounting piece being formed with a rotation stop formed by a molded resin portion molded with at least a part of the metal plate as an insert part and configured to linearly contact the first screwing/fixing piece or the second screwing/fixing piece when viewed from outside of the opening, wherein
the molded resin portion includes a reinforcing portion configured to cover at least one principal surface of a base end part of the first mounting metal piece or the second mounting metal piece.

15. The opening closure device of claim 14, wherein:
the rotation stop is configured to surround the first screwing/fixing piece or the second screwing/fixing piece at least except in a part where the first screwing/fixing piece or the second screwing/fixing piece is linked to the cover body.

16. The opening closure device of claim 14, wherein:
both the first mounting piece and the second mounting piece are formed with the rotation stop.

* * * * *